Figure 1:
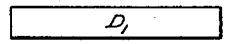

M. J. E. ROTSAERT.
PRINTER'S BORDER MITERING JIG.
APPLICATION FILED MAY 9, 1918.

1,313,606.

Patented Aug. 19, 1919.
3 SHEETS—SHEET 1.

INVENTOR.
Medard J.E. Rotsaert
BY David E. Lofgren
ATTORNEY.

M. J. E. ROTSAERT.
PRINTER'S BORDER MITERING JIG.
APPLICATION FILED MAY 9, 1918.

1,313,606.

Patented Aug. 19, 1919.
3 SHEETS—SHEET 2.

INVENTOR.
Medard J E Rotsaert
BY David E Lofgren
ATTORNEY.

M. J. E. ROTSAERT.
PRINTER'S BORDER MITERING JIG.
APPLICATION FILED MAY 9, 1918.

1,313,606.

Patented Aug. 19, 1919.
3 SHEETS—SHEET 3.

INVENTOR.
BY Medard J.E. Rotsaert
David E. Lofgren
ATTORNEY.

UNITED STATES PATENT OFFICE.

MEDARD J. E. ROTSAERT, OF PORTLAND, OREGON.

PRINTER'S-BORDER-MITERING JIG.

1,313,606.  Specification of Letters Patent.  Patented Aug. 19, 1919.

Application filed May 9, 1918. Serial No. 233,475.

*To all whom it may concern:*

Be it known that I, MEDARD J. E. ROTSAERT, a citizen of the United States, in the city of Portland, the county of Multnomah, and State of Oregon, have invented certain new and useful Improvements in Printers'-Border-Mitering Jigs, and do hereby declare the following to be a full, clear, and exact description of same, reference being had to the accompanying drawings and to the letters and figures of reference marked thereon and mentioned in the specification.

This invention relates more particularly to that class of devices used in typography in which borders are beveled to form rectangles, or where any strip of type border must be accurately gaged to length and bevel.

It is to be understood that my invention is merely an attachment which is used on the style of saw table illustrated in the drawings and which is in common use in the printing establishments throughout the country for the purpose of mitering wood, brass or typemetal borders, although it is apparent that it can be used on any machine which is adapted to cut miters.

The object of this device is to produce an exceedingly simple, efficient and inexpensive means for rapidly beveling and cutting to exact lengths pieces of type border, and leaving them absolutely free from the bur always resulting from the usual method of producing this class of work.

Figure 2:
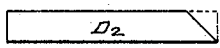
Figure 3:
Figure 4:
Figure 6:
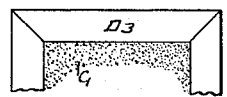
Figure 5:
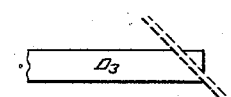
Figure 8:
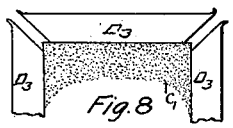
Figure 7:
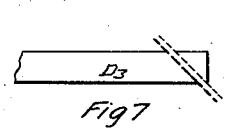
Figure 10:
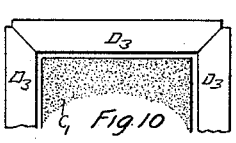
Figure 9:
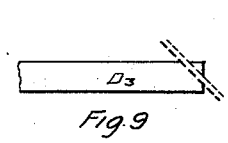
Figure 14:
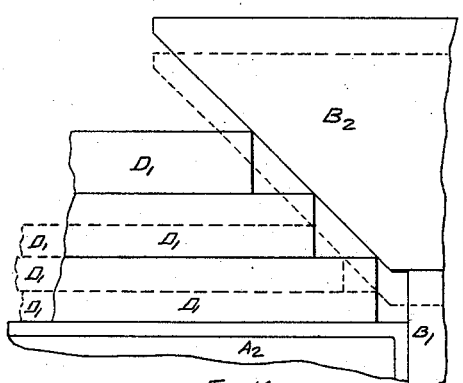
Figure 11:
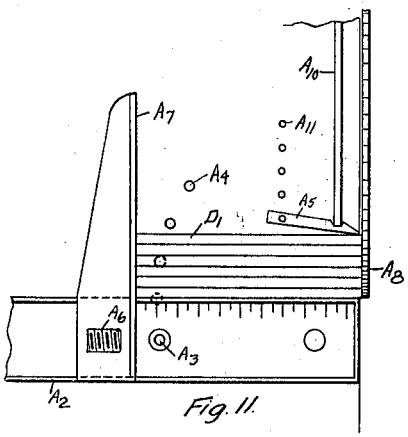
Figure 12:
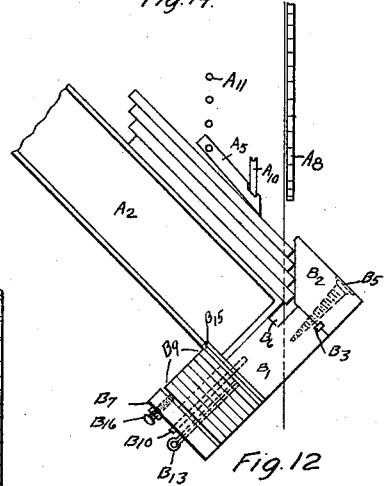
Figure 13:
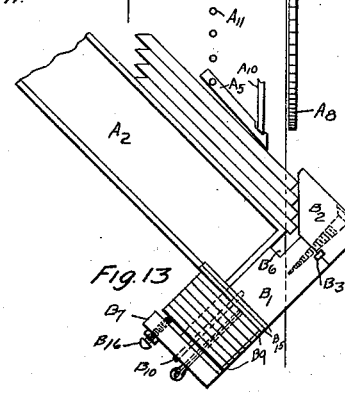
Figure 15:
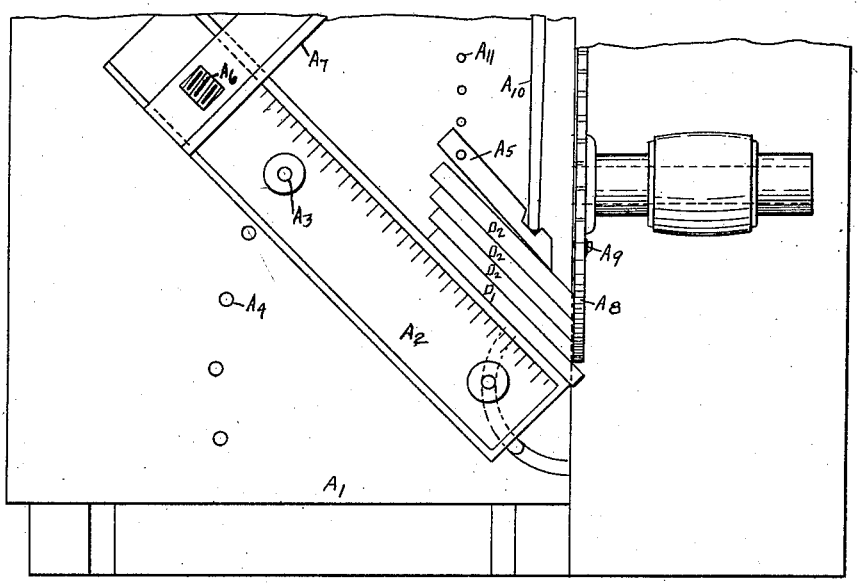
Figure 16:
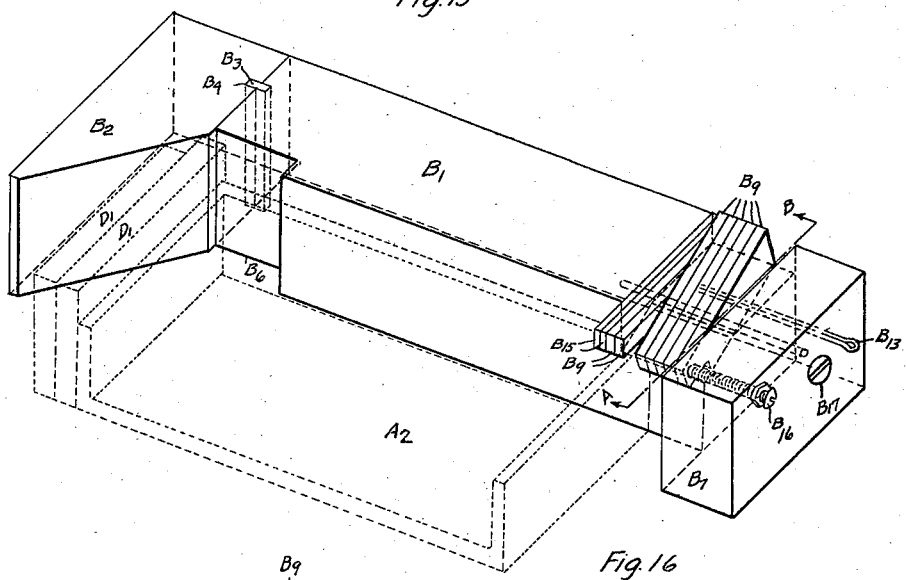
Figure 17:
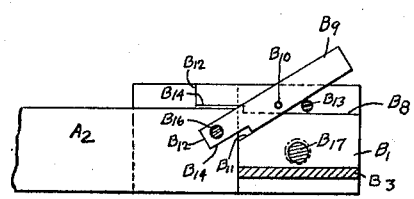
Figure 18:
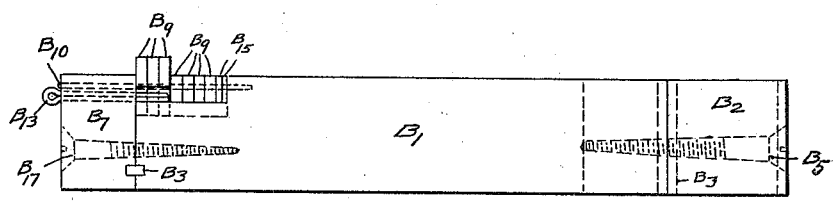
Figure 19:
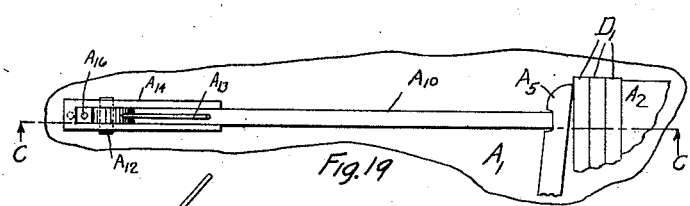
Figure 20:
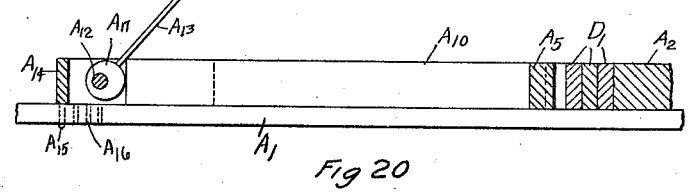
Figure 21:
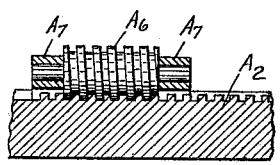

Referring to the accompanying drawings, Figure 1 is a front elevation of the piece of metal or wood to be used and cut to exact length; Fig. 2 is front elevation after one end has been beveled by the second operation; Fig. 3 is similar view showing effects of third operation; Fig. 4 is an end elevation of Figs. 1, 2 and 3; Fig. 5 shows line along which saw must cut to secure perfectly sized bur-free work; Fig. 6 shows how the product may be assembled around a cut or type $C^1$ to form a perfectly sized type border; Fig. 7 shows saw cutting off corner and producing bur; Fig. 8 shows the assembled result in under sized border and projecting bur; Fig. 9 shows saw avoiding corners to prevent burs; Fig. 10 shows assembled result of over sized borders and imperfect corners, the resulting space between cut and border preventing proper locking of form and the extra space required by the gain in outside measure makes it impossible where only lesser space is available; Fig. 11 is diagrammatic view of first operation of cutting stock to length; Fig. 12 is a diagram of second operation of locating sized parts in clamp preparatory to cutting first miter; Fig. 13 is a diagram of third operation of locating work preparatory to cutting second miter; Fig. 14 is enlarged plan showing reason for change in position of gage head $B^2$ for different thickness of border; Fig. 15 is plan of the usual mitering machine showing saw taking cut after jig has completed its work and been removed; Fig. 16 is a perspective of the device; Fig. 17 is a sectional elevation through A—B Fig. 16 showing the two positions of blades $B^9$ and $B^{15}$ and how they are retained in either position; Fig. 18 is a rear elevation of the device; Fig. 19 is a plan of clamping device in use on machines on which my improved jig is used; Fig. 20 is a sectional elevation of clamping device shown in Fig. 19 along C—C; Fig. 21 shows the method for adjusting the right angled strip which is used to cut lengths to correct length before mitering.

In the printing art much time has been consumed in the apparently simple operation of producing borders with mitered corners which shall be free from burs and whose dimensions shall be exact and possessing perfectly fitted miters. It is evident that to produce perfect work as shown in Fig. 6 the trimmer or saw must not depart from the heavy dotted line shown in Fig. 5, the area between the two dotted lines representing kerf. That is to say, the finished cut must pass exactly through the corner of the previously sized piece Fig. 1. If the saw cuts the corner as illustrated in Fig. 7 the result is a bur and a subtraction from the total length of the product, which results in condition shown in Fig. 8 with unfilled corners. Attempts to remove the bur usually result in chipping or breaking away of the mitered point.

If, on the other hand, the opposite extreme is resorted to as shown in Fig. 9 the result will be as in Fig. 10 which is equally undesirable where space is limited and neat corners desired, in addition to difficulty in locking the forms, which is self-explanatory in Fig. 10. It must therefore be apparent that since speed, accuracy and neatness are the essential requisites of the ideal method of producing these borders, these merits of my invention are unquestionable.

Those versed in the printing art are aware that the mitering operation in printing establishments is performed on a saw having a horizontal slidable table $A^1$ upon which is mounted frame $A^2$ capable of angular motion and stopable in any desired position with index pin $A^3$ in holes $A^4$.

For the purpose of illustration a clamp $A^5$ will be shown as a lever pivoted in holes $A^{11}$ to hold the work, which lever is operated by rod $A^{10}$ while mitering. The direction of rotation of saw $A^8$ which carries the usual form of trimmer $A^9$ is such as to hold the work against table $A^1$ and frame $A^2$. In conjunction with the above style of machine I use my device for the purpose mentioned.

Fig. 16 is a perspective view of my device, the function of which is to locate the work accurately on the saw table before applying the clamp $A^5$ after which the printer's border mitering jig, as I shall call my device, is removed to make room for the saw toward which the work will now be pushed.

The elements of my improved jig are as follows: $B^1$ is the body or shank which is made of metal or wood, preferably the latter, as wood is lighter and less apt to injure itself or other objects as a result of sudden contact such as falling, and also is less liable to injure the work, and of exactly the same thickness as the depth of the border to be cut, which of course is type high. The reason for this will be explained later.

$B^2$ is a beveled head, the angle of which corresponds to the angle of the miter to be cut and is the complement of the angle which frame $A^2$ bears to the axis of the cutting saw. This head is made removable for replacement or substitution of special angle heads.

$B^3$ is a tongue of metal which fits snugly into the groove $B^4$ on $B^1$ and $B^2$ which are united by screw $B^5$.

$B^6$ is an offset in $B^1$ for the purpose of allowing the corner of the blank $D^1$ which is adjacent to $A^2$ to project slightly past the end of frame $A^2$ so that the saw $A^8$ will not be obliged to cut close to frame $A^2$.

On the opposite end of $B^1$ is the projection $B^7$ which carries lock-nutted screw $B^{16}$ and which is secured to $B^1$ by screw $B^{17}$ and metal tongue $B^3$. In the face of $B^1$ is cut the groove $B^8$ which is of sufficient width to hold a number of metal blades $B^9$ and $B^{15}$ which are pivoted on a common pivot $B^{10}$.

The floor of $B^8$ is further relieved by the bevel $B^{11}$ which permits $B^9$ and $B^{15}$ to be depressed until their projecting tips $B^{12}$ are in front of the screw $B^{16}$, in which position they can be secured by the spring cotter $B^{13}$ which can pass beneath their elevated ends.

A portion of $B^{12}$ is cut away as at $B^{14}$ to provide clearance between the top of frame $A^2$ and the bottom of blades $B^9$ and $B^{15}$ which may not be depressed.

It will be noticed that blades $B^{15}$ are thinner than $B^9$, the reason for which will be explained later.

When using my device in the production of mitered borders the process is as follows: The desired number of pieces to be cut to a given length and represented by $D^1$ are placed against the frame $A^2$ as in Fig. 11 and snugly against the gage $A^7$ which is at right angles to face $A^2$ and secured in place by screw $A^6$. The clearance between the saw and the carriage $A^2$ is accurately determined by screw $B^{16}$. The table is now moved toward the saw which gives us a uniform length of blanks $D^1$, Figs. 1 and 11. Frame $A^2$ is now revolved to secure the desired miter angle and my device $B^1$, Fig. 16 is now held against end of $A^2$ as shown in Fig 12, and the blanks $D^1$ which have been temporarily freed from clamp $A^5$ by a movement of rod $A^{10}$ are moved snugly against gage $B^2$ and the clamp $A^5$ is again applied and my device removed for the second sawing operation. The saw having cut exactly across the corners it can readily be seen that no bur is produced and pieces are uniform in length. All the gage will hold being cut at one setting.

The clamp $A^5$ is now released and the blanks are then in the form of $D^2$, Fig. 2, and the square ends are brought against my device which has been replaced in the same position as it had in the previous operation which is now repeated and the border completed, care being taken that the ends already beveled occupy the position shown in Fig. 13 and every part $D^2$ touches gage $B^2$.

By inspection of Fig. 14 it will be seen that the position of head $B^2$ is a variable controlled by the thickness of the border to be cut. To adapt my device to various gages of stock to be mitered I have placed blades $B^9$ and $B^{15}$, which can be made to occupy a position between screw $B^{16}$ and the rear face of frame $A^2$. By depressing one or more of these blades, beginning of course at the one nearest the screw $B^{16}$, we secure a position of our gage $B^2$ necessary to cut the corners as described.

The object of the lock-nutted screw $B^{16}$ is to furnish the desired clearance for the saw after blades $B^9$ and $B^{15}$ have determined the position of the cut.

As before mentioned, the jig $B^1$ is made from stock which is the exact thickness of the border blank depth or type high. The objects of this are first to be able to use stock now in the market and second to provide an indicator to show the presence of any kerf beneath the blanks before clamping, as the top of the blades should be flush with the top of the jig $B^1$.

It will be seen in Figs. 19 and 20 that part $A^5$ is held against the work $D^1$ by part $A^{10}$ which rests on the table $A^1$ and fits into a notch in part $A^5$. Pressure is applied by lever $A^{13}$ which operates eccentric $A^{17}$ which is mounted on shaft $A^{12}$. Shaft $A^{12}$ is supported by the slotted part $A^{14}$ which also fits over the end of part $A^{10}$. Part $A^{14}$ is equipped with a dowel pin $A^{15}$ which can be dropped into any of the heads $A^{16}$ in the table $A^1$ so that the clamped parts will be brought within range of eccentric $A^{12}$. It is self evident that a proper movement of lever $A^{13}$ will remove the pressure from part $A^{10}$. However the clamp and its parts do not enter into this description as a part of my invention, but as part of a machine upon which my device is used.

The advantage of being able to cut any desired number of border pieces with one saw cut is obvious since it not only saves time but it renders the parts of exact size, and by cutting exactly through the corner of the blank entirely eliminates the bur and produces borders ready for the forms. Up to this time the borders have been cut separately and of uncertain lengths.

$B^9$ and $B^{15}$ are of unequal thickness, $B^9$ being 6 points thick and $B^{15}$ only 3 points thick. Each unit of blade inserted before screw $B^{16}$ adjusts the head $B^2$ to gage for one unit less in the mitering operation, the thinnest plates representing three units. Each unit of plate representing one point of printer's measure which is equal to .0138 inches or about $\frac{1}{72}$ of one inch. A three unit plate will naturally adjust the gage three units or points, and a six unit or point plate will adjust the gage six units.

It will be understood that the adjustment thus secured is not required on account of different lengths of borders, but on account of different thicknesses of borders. The three point or ¼ pica being the thinnest border used in ordinary work, and the six point or ½ pica being next it was not deemed necessary to use intermediate units in this invention, although it can be seen that any system of units can be used with equal success. While I have stated that each unit of plate inserted before the screw $B^{16}$ adjusts the head $B^2$ to gage for one unit less in the mitering operation, it is apparent that since the thinnest plate inserted is three units that the smallest adjustment that can be made is three units, etc.

As shown on the drawings the sum total of all the blades is 48 points from which any variation required may be selected.

Another important advantage which works for time saving is the fact that when using my device it matters not if the blanks $D^1$ are of different lengths provided they are of the correct length. This is because my device measures from the end which is to be mitered. This means that the entire table may be filled with correctly sized blanks, care merely being taken that each piece is reversed as shown in Fig. 13 before cutting its second miter.

While I have thus described my invention, I do not desire to limit myself to this precise form of construction, kind of material or method of application of my invention but intend that it shall cover all forms and modifications that fall fairly within the appended claims.

What I claim as new and desire to protect by Letters Patent of the United States, is:

1. A border mitering jig consisting of a body member of rectangular cross section, a work stop member secured to one end of said body member and projecting angularly past one face of same, a jig stop member secured to the opposite end of said body member and projecting past the same face of said body member as does said work stop member, a number of blade members pivotally mounted in a manner that they may be swung between the work stop and jig stop members and against the projection formed by said jig stop member substantially as described.

2. The combination of a severing device, and a work gage for determining the angle of the work with reference to said severing device, of an appliance for determining the position of the end of the work to be severed with reference to said severing device, having means whereby said appliance may be adjustably applied to said work gage, to act as a stop for the end of the work, and maintain a stop face parallel to the line of severing, while varying the distance of said face from said plane and from the face of the work gage.

3. In a device for mitering type borders, a mitering saw having a circular saw with a horizontal slidable table upon which is mounted a frame member capable of being set and held at an angle to the cutting line of the saw table, the end of said frame near saw member being pivoted to said saw table while the opposite end of the saw frame member has an adjustable stop at right angles to the length of the frame member and pointing away from the operator, in combination with a mitering jig having a body member whose cross section is rectangular in form and whose length is greater than the breadth of said frame member and having at one end of said body member a work stop member secured thereto and projecting beyond one lateral face of said body member in a manner to form an obtuse angle thereto, while at the opposite end of said body member, and projecting past the said face of body member as does the angular projection of said work stop member, is a jig stop member and pivotally mounted in a slot in the upper face of said body member are a number of blade members arranged in a manner that any part of same can be interposed between said frame member and said jig stop member, substantially as described and illustrated.

4. In a border mitering device, a sawing machine having a horizontal sliding table upon which is mounted a frame in such a manner as to form an adjustable guide on said table which will hold work at any desired angle to the cutting line of saw, in combination with a border mitering jig constituting a body member having the general shape of a prism which has a head secured to one end of said prism and one side of said head projecting past a lateral face of said prism in a manner to form an obtuse angle with said face of prism and the end of said prism member to which said angular head is secured being slightly cut away on the face of the prism past which the angular head projects and at the opposite end of prism member from the end to which said angular head is secured is formed a foot which projects past same side of prism as does its angular head and said prism being recessed at the junction of said foot and prism member, and said foot member having a pivot which operates said recess, a jig adjustment means consisting of a number of blade members mounted on said pivot in a manner to permit one end of said blade member to be depressed in front of projection of said foot member, a clearance means consisting of a screw located in said foot member in a position which allows the end of said screw to press against the depressed end of said blade members, a plate position retaining means consisting of a spring cotter passing through said foot in a manner to pass beneath the elevated ends of said depressed blade members, all for the purpose set forth in the manner described.

5. An appliance or jig for coöperation with the end of a mitering table work gage, comprising a body having at one side a straight face, an overhanging inclined stop face, and an intermediate recess, and means for determining the degree of adjustment of said straight face along the edge and beyond the face of the work gage.

MEDARD J. E. ROTSAERT.

Copies of this patent may be obtained for five cents each, by addressing the "Commissioner of Patents, Washington, D. C."